(12) United States Patent
Steen (10) Patent No.: US 11,606,899 B2
(45) Date of Patent: Mar. 21, 2023

(54) HEIGHT OF CUT AND RAKE ADJUSTMENT SYSTEM

(71) Applicant: DEERE & COMPANY, Moline, IL (US)

(72) Inventor: Chad C. Steen, Fuquay Varina, NC (US)

(73) Assignee: DEERE & COMPANY, Moline, IL (US)

( * ) Notice: Subject to any disclaimer, the term of this patent is extended or adjusted under 35 U.S.C. 154(b) by 461 days.

(21) Appl. No.: 16/808,826

(22) Filed: Mar. 4, 2020

(65) Prior Publication Data

US 2021/0274708 A1   Sep. 9, 2021

(51) Int. Cl.
*A01D 34/74*   (2006.01)
*A01D 34/66*   (2006.01)
*A01D 101/00*   (2006.01)

(52) U.S. Cl.
CPC ............ *A01D 34/74* (2013.01); *A01D 34/66* (2013.01); *A01D 2101/00* (2013.01)

(58) Field of Classification Search
CPC .... A01D 34/74; A01D 34/66; A01D 2101/00; A01D 75/306
See application file for complete search history.

(56) References Cited

U.S. PATENT DOCUMENTS

| | | | | |
|---|---|---|---|---|
| 3,548,572 A | * | 12/1970 | Ferber | A01D 34/661 56/192 |
| 3,589,116 A | * | 6/1971 | Speiser | A01D 75/306 56/249 |
| 3,680,880 A | * | 8/1972 | Blaauw | A01D 67/005 280/43 |
| 4,291,522 A | * | 9/1981 | Kawasaki | A01D 34/64 56/15.8 |
| 4,422,283 A | * | 12/1983 | Scanland | A01D 34/81 56/320.2 |
| 5,398,489 A | * | 3/1995 | Oshima | A01D 34/68 56/320.1 |
| 6,047,530 A | | 4/2000 | Bednar | |
| 6,085,508 A | | 7/2000 | Miatt et al. | |

(Continued)

FOREIGN PATENT DOCUMENTS

| | | | | |
|---|---|---|---|---|
| EP | 0965259 A1 | * | 12/1999 | ............ A01D 34/74 |
| EP | 2371198 A1 | * | 10/2011 | ............ A01D 34/74 |

(Continued)

OTHER PUBLICATIONS

Extended European Search Report and Written Opinion issued in European Patent Application No. 21154280.8, dated Jul. 8, 2021, in 12 pages.

*Primary Examiner* — Arpad F Kovacs (57) ABSTRACT

A height of cut and rake adjustment system for a rough, trim and surround mower deck with a pair of front height of cut arms and a pair of rear height of cut arms. Each height of cut arm is pivotably mounted to the mower deck on a pivot axis below an upper end of each height of cut arm. An adjustable height of cut linkage extends between the upper end of each front height of cut arm and the upper end of each rear height of cut arm. An adjustable rake linkage extends between the upper end of each front height of cut arm and an intermediate portion of each rear height of cut arm below the pivot axis.

12 Claims, 6 Drawing Sheets

(56) References Cited

U.S. PATENT DOCUMENTS

| | | | |
|---|---|---|---|
| 6,205,754 B1 * | 3/2001 | Laskowski | A01D 75/306 |
| | | | 56/15.1 |
| 6,336,311 B1 | 1/2002 | Bednar | |
| 7,478,519 B2 * | 1/2009 | Phillips | A01D 75/306 |
| | | | 56/15.9 |
| 7,716,907 B2 | 5/2010 | Joliff et al. | |
| 9,301,444 B2 | 4/2016 | Campbell et al. | |
| 10,681,853 B2 * | 6/2020 | McHale | A01B 63/14 |
| 2015/0313077 A1 * | 11/2015 | Campbell | A01D 34/006 |
| | | | 56/320.1 |
| 2016/0249528 A1 * | 9/2016 | Steen | A01D 34/71 |
| | | | 56/17.5 |
| 2019/0150359 A1 * | 5/2019 | Gust | A01D 34/74 |
| 2021/0227745 A1 * | 7/2021 | Fredenburg | A01D 34/82 |
| 2022/0117154 A1 * | 4/2022 | Steen | B60B 33/066 |

FOREIGN PATENT DOCUMENTS

| | | | | |
|---|---|---|---|---|
| GB | 2367475 A | * | 4/2002 | A01D 34/74 |
| GB | 2413254 A | * | 10/2005 | A01D 34/74 |
| GB | 2494242 A | * | 3/2013 | A01D 34/54 |
| GB | 2494244 A | * | 3/2013 | A01D 34/74 |

* cited by examiner

HEIGHT OF CUT AND RAKE ADJUSTMENT SYSTEM

FIELD OF THE INVENTION

The present invention relates to grass mowing machines for golf courses and more specifically to a height of cut and rake adjustment system for rough, trim and surround mowers.

BACKGROUND OF THE INVENTION

Many new and existing golf courses have narrowed their fairways and expanded their rough areas on either side of the fairways. Roughs require less care than fairways, so narrowing the fairways allows golf course operators to lower their maintenance costs. For example, irrigation requirements may be reduced if only the fairways are watered. If grasses in the roughs are allowed to grow longer, those non-irrigated areas are less brown. Trees and other aesthetic features may be located in the roughs, because roots and shade can inhibit turf growth in the fairways.

However, golf course roughs still must be maintained regularly using grass mowing machines that can mow the vegetation at an acceptable length and appearance. Equipment for mowing golf course roughs typically includes a traction vehicle carrying three or more rotary cutting decks, each rotary cutting deck mounted on the end of a lift arm extending from the traction vehicle. Carrying the rotary cutting decks with lift arms extending from the front or sides of the traction vehicle is necessary and desirable, instead of towing the rotary cutting decks behind the vehicle, because it is necessary for the mower to provide close trims next to trees, bunkers or other hazards. Each lift arm also may be used to move a rotary cutting deck between a mowing position and a transport position. The mounting devices also should allow for pitch (front to back pivoting) and yaw (side-to-side pivoting) of the rotary cutting decks. Additionally, mounting devices should allow adjustment of the front to back angle of a rotary cutting deck for the desired rake or pitch.

Traction vehicles carrying several rotary cutting decks may travel at speeds of 6 to 8 miles per hour when mowing golf course roughs. The traction vehicle's weight may be in excess of 2000 pounds. Each rotary cutting deck may be subject to shocks from impacts against the ground surface or objects during mowing. To withstand the rigorous mowing conditions, rotary cutting decks typically are made of thick sheet steel, such as 7 gage or 10 gage sheet steel. Each rotary cutting deck may have a diameter between about 18 inches and 27 inches, weigh at least 120 pounds, and may have a cutting blade rotated by a hydraulic or electric motor.

Golf course operators sometimes need to change the height of cut of rotary cutting decks on a rough, trim and surround mower. For example, the height of cut may need to be changed if the mower goes from an intermediate rough with a 1½ to 2 inch height of cut, to a full length rough with a 3 to 4 inch height of cut. The height of cut also may need to be changed if the machine is used to mow rough for tournaments where rough heights can be as long as 6 inches. Additionally, golf course operators may change the height of cut of rough, trim and surround mowers due to seasonal variations, shade conditions, or different types of grass or vegetation in different rough areas of a golf course.

Rough, trim and surround mowers may include side plates having a vertically-spaced series of holes, and bolts extending through the holes to secure the deck to the side plates. The deck height may be adjusted by changing the holes in the deck plates and/or the holes in the side plates through which the bolts extend. Other adjustment mechanisms include spacers that may be stacked on several pins that support the deck on a frame, or on casters that are mounted in vertically oriented sleeves. Changing height of cut using the holes or spacers at each of four adjustment points can be cumbersome and time consuming.

U.S. Pat. No. 7,716,907 assigned to Deere & Company of Moline, Ill. relates to a rotary deck height of cut adjustment mechanism for a rough, trim and surround mower that includes a front pair and a rear pair of height of cut arms, and an axle extending between each pair. Each of the four height of cut arms may be pivoted to support the mower deck at different cutting heights, and each has a notch lock that may be moved between a locked position and an unlocked position at each cutting height and rake angle. A lever may be used to push each notch lock from an unlocked position to a locked position or pull the notch lock from a locked position to an unlocked position.

U.S. Pat. No. 9,301,444 assigned to Deere & Company relates to a rotary deck height of cut adjustment mechanism for a rough, trim and surround mower with front and rear height of cut arms supporting a rotary cutting deck, and at least one height of cut adjustment screw that may be rotated to simultaneously change the angle of the height of cut arms. This height of cut adjustment mechanism is faster and more efficient to adjust cutting heights, reduces maintenance and is low in cost.

A height of cut and rake adjustment system is needed for rough, trim and surround mowers that provides the advantages of fast adjustment along with simplified, inexpensive, easily replaceable components. A height of cut and rake adjustment system is needed that may be used with many existing rotary cutting decks on rough, trim and surround mowers.

SUMMARY OF THE INVENTION

A height of cut and rake adjustment system includes a pair of height of cut linkages extending fore and aft above the left and right sides of a mower deck, and a pair of rake linkages extending fore and aft adjacent the left and right sides of the mower deck. Each of the height of cut linkages and rake linkages have an effective length that is manually adjustable to change the angles of a pair of front height of cut arms and a pair of rear height of cut arms relative to the mower deck.

BRIEF DESCRIPTION OF THE DRAWINGS

FIG. 6 is a perspective view of a traction vehicle having several rotary decks mounted on lift arms extending from

DESCRIPTION OF THE PREFERRED EMBODIMENT

As shown in FIGS. 1-6, in a first embodiment, rotary cutting deck 100 includes a circular inverted dish-shaped cutting chamber 102. A motor such as hydrostatic motor 104 may be mounted to the rotary cutting deck. The motor turns a cutting blade attached to a generally vertically aligned spindle under the deck. The rotary cutting deck may be supported over the ground surface by ground engaging members at the front and rear of the deck, such as front pair of rollers 106 and rear roller 108.

Figure 1:
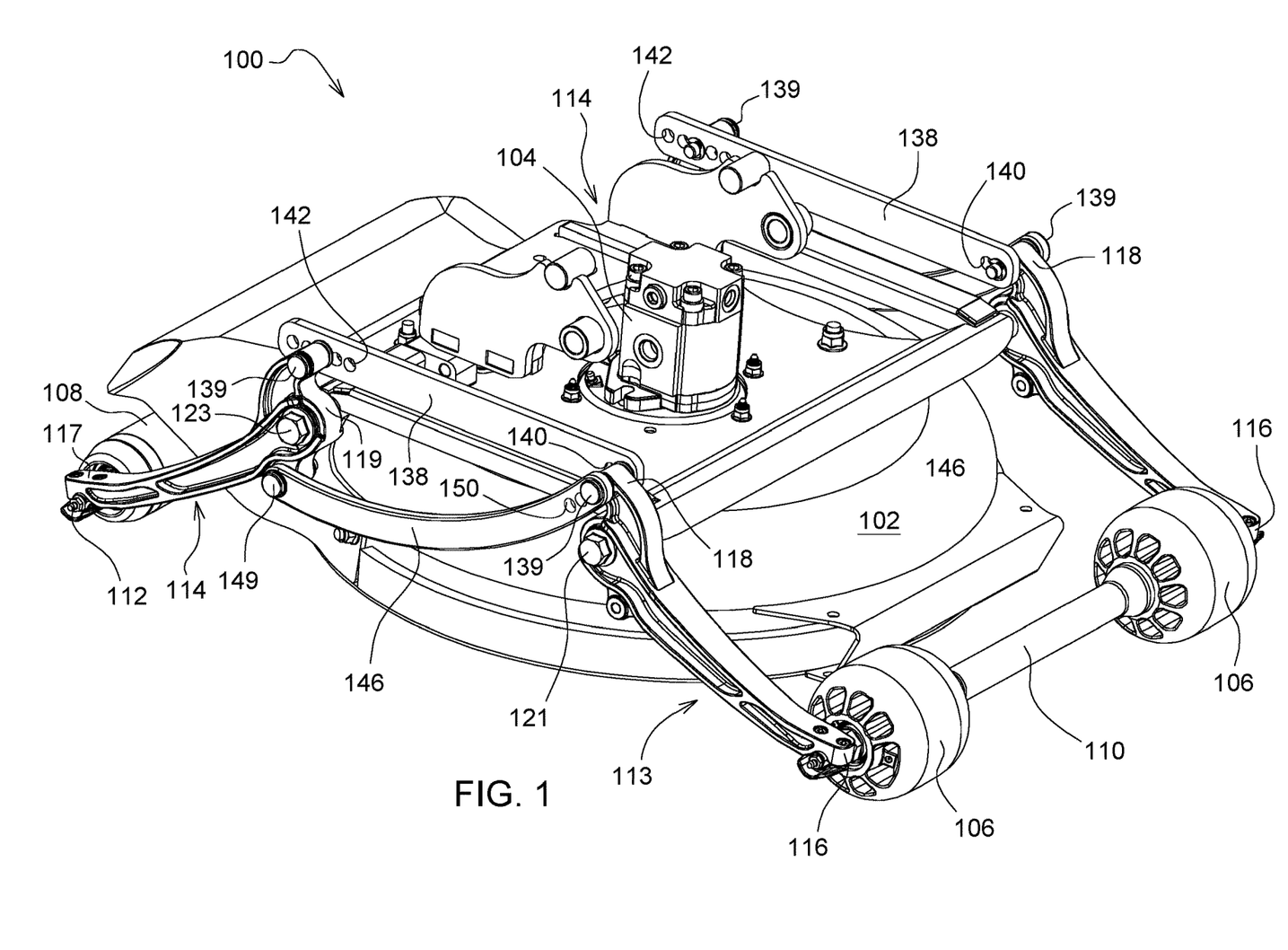
FIG. 1 is a perspective view of a height of cut and rake adjustment system according to a first embodiment of the invention.
Figure 2:
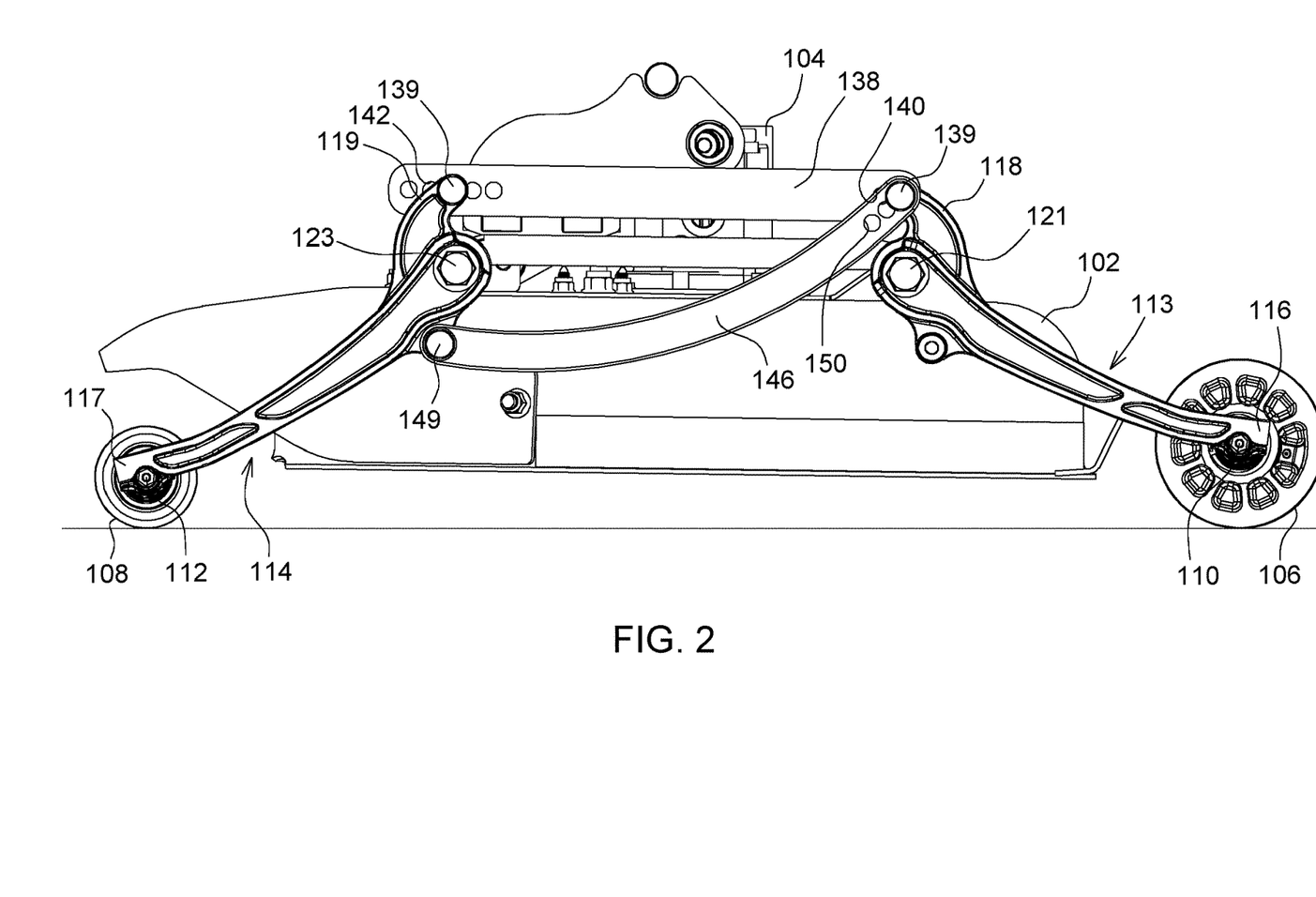
FIG. 2 is a side view of a height of cut and rake adjustment system at a first cutting height and rake according to a first embodiment of the invention.
Figure 3:
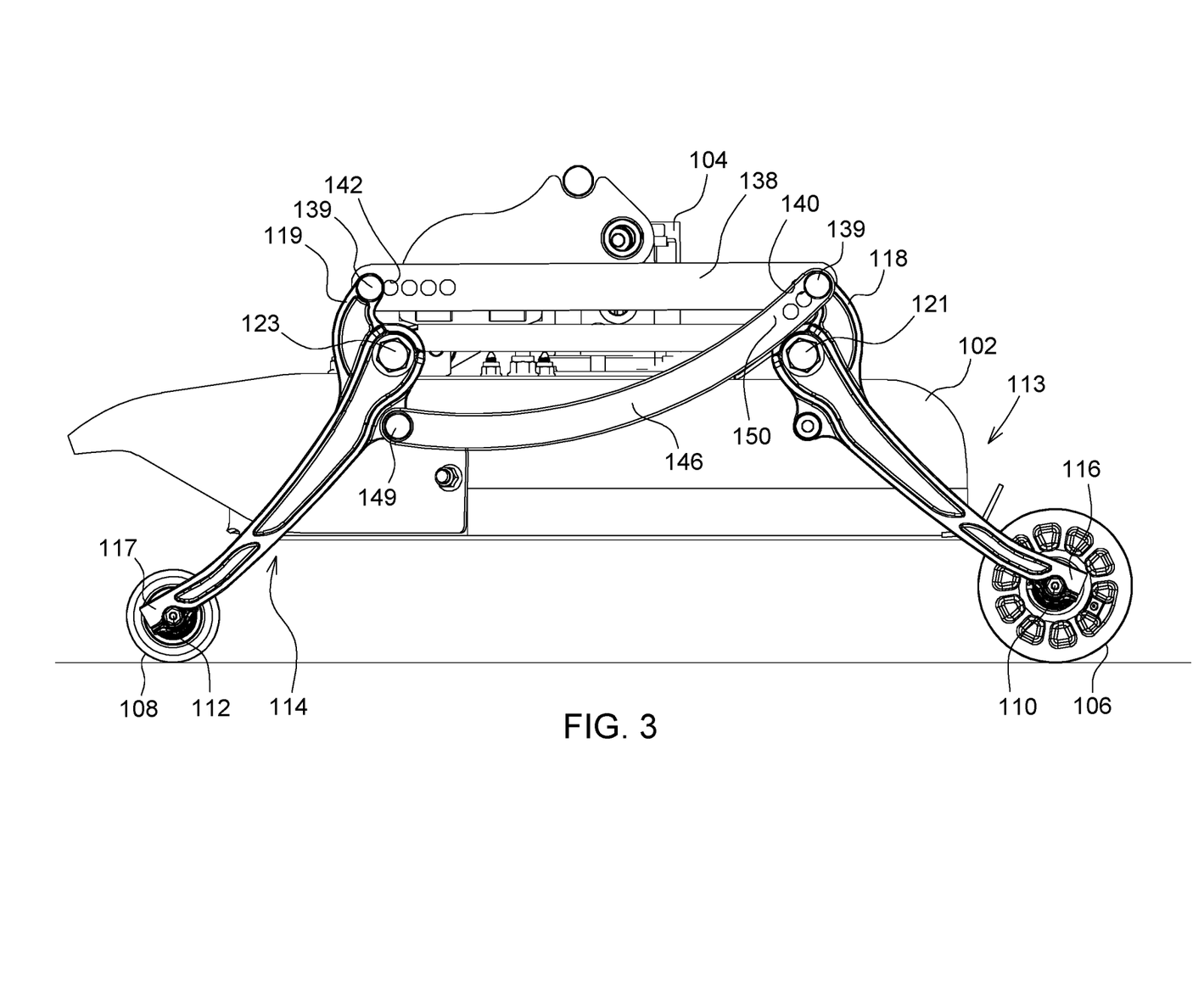
FIG. 3 is a side view of a height of cut and rake adjustment system at a second cutting height according to a first embodiment of the invention.
Figure 4:
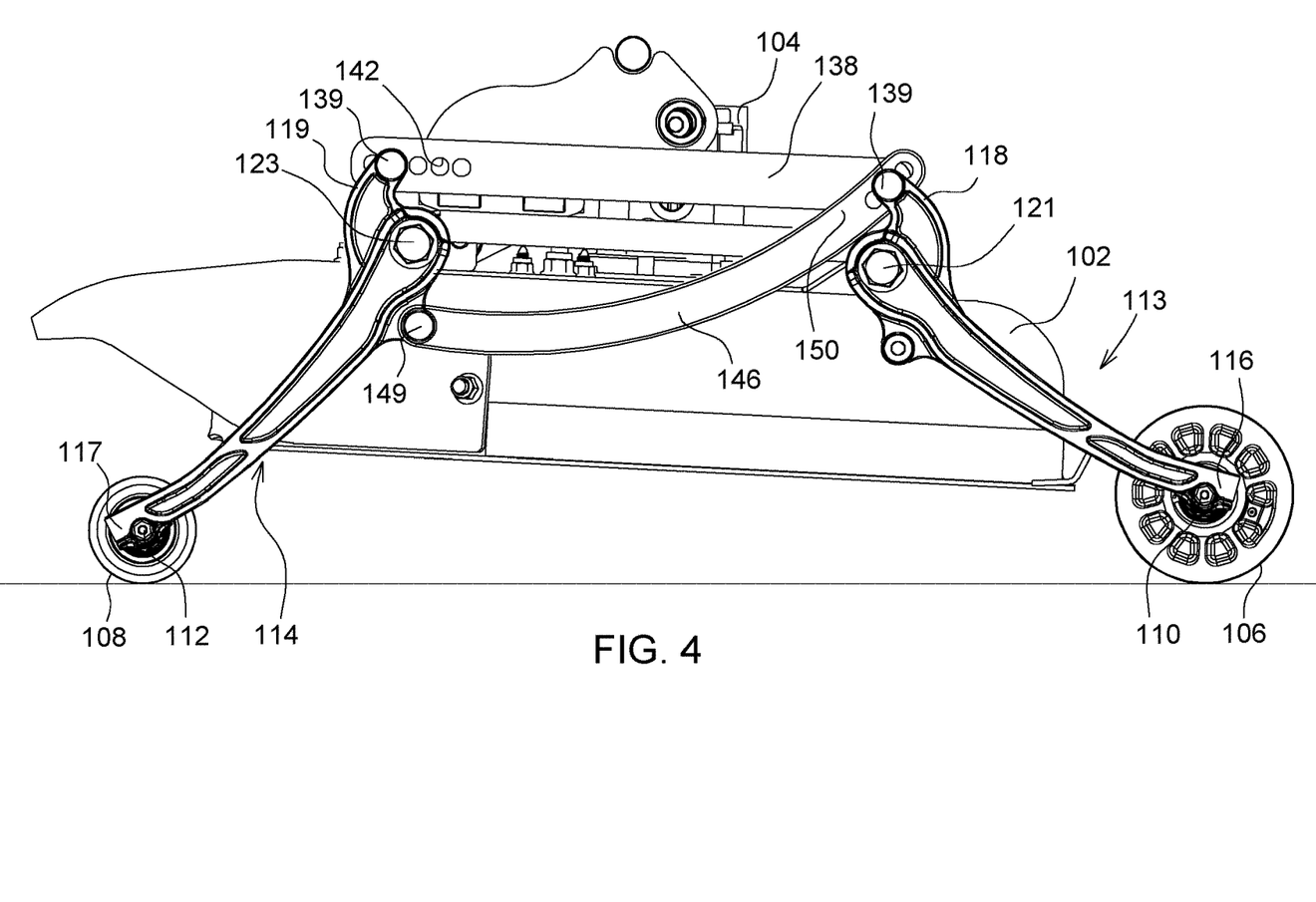
FIG. 4 is a side view of a height of cut and rake adjustment system at a second rake according to a first embodiment of the invention.
Figure 5:
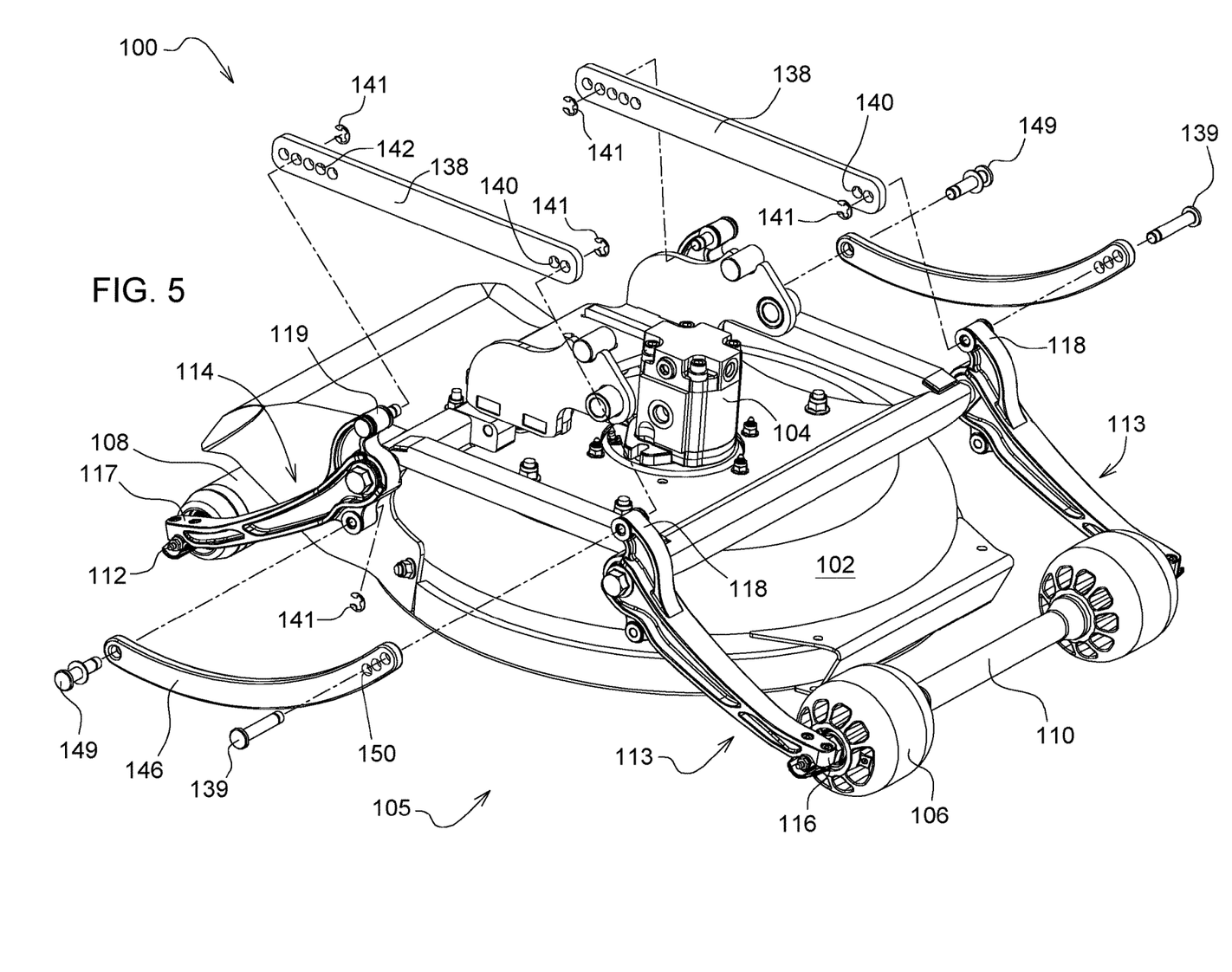
FIG. 5 is a partially exploded perspective view of a height of cut and rake adjustment system according to a first embodiment of the present invention.
Figure 6:
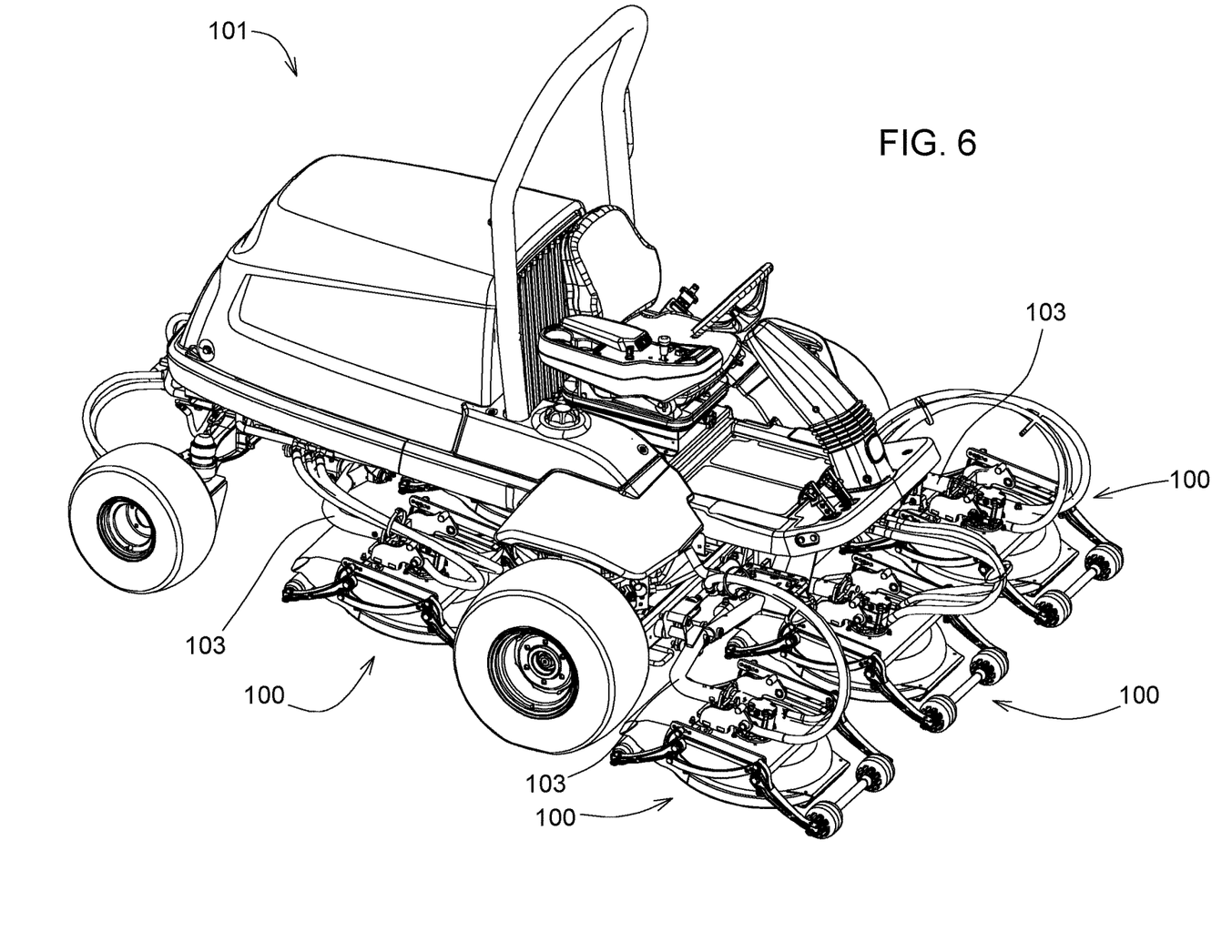

In one embodiment, as shown in FIG. 6, three or more rotary cutting decks may be mounted to traction vehicle 101. Each rotary cutting deck 100 may be pivotably supported at the end of a lift arm 103 which the operator may actuate with one or more hydraulic cylinders or electric lift mechanisms to raise or lower the rotary cutting decks between mowing positions and transport positions.

In one embodiment, one or more rollers, casters or wheels 106 may be rotatably mounted to and supported by axle 110 at or near the front of the rotary cutting deck. Alternatively, other ground engaging members such as a roller, caster or wheel may be independently mounted to each front height of cut arm 113. One or more rear rollers 108 may be rotatably mounted to and supported by internal shaft or axle 112 at or adjacent the rear of the rotary cutting deck. Alternatively, the rear of the rotary cutting deck may be supported by an axle with one or more casters or wheels. Or other ground engaging members such as a roller, caster or wheel may be independently mounted to each rear height of cut arm 114.

In one embodiment, height of cut and rake adjustment system 105 may include a pair of adjustable and replaceable height of cut linkages 138. Each height of cut linkage may connect the upper end of front height of cut arm 113 to the upper end of rear height of cut arm 114. The height of cut and rake adjustment system may be used to lower the height of cut by decreasing the effective length of the height of cut linkages which reduces the angle of the height of cut arms relative to the rotary cutting deck, or raise the height of cut by increasing the effective length of the height of cut linkages which increases the angle of the height of cut arms relative to the rotary cutting deck.

In one embodiment, the height of cut and rake adjustment system may include a pair of height of cut linkages 138 that may be bars or rods extending fore and aft above the left edge and right edge of the rotary cutting deck. Each height of cut linkage may be a generally flat, linear one piece steel structure having one or more holes through each of its ends. A first pin 139 may be inserted through a hole 140 in the height of cut linkage's first end to connect it to the second or upper end 118 of the front height of cut arm, and a second pin 139 may be inserted through a hole 142 in the height of cut linkage's second end to connect it to the second or upper end 119 of the rear height of cut arm. Each pin may be retained in place with a clip 141. The height of cut may be changed easily by removing the clips and inserting the pins into different holes, or selecting height of cut linkages with different lengths.

In one embodiment, the height of cut and rake adjustment system may include a front axle 110 or a roller, caster or wheel mounted to each front height of cut arm 113 adjacent a first or lower end 116 of the arm. Each front height of cut arm 113 may have a pivot axis 121 located below the second or upper end 118 of the front height of cut arm, pivotably mounting the front height of cut arm to mounting bracket 120 on the rotary cutting deck. The upper end of each front height of cut arm may be connected with a pin 139 through a first end of height of cut linkage 138. Rear axle 112 or a roller, caster or wheel may be mounted to each rear height of cut arm 114 adjacent a first or lower end 117 of the arm. Each rear height of cut arm 114 may have a pivot axis 123 located below the second or upper end 119 of the rear height of cut arm, pivotably mounting the rear height of cut arm to mounting bracket 120. The upper end of each rear height of cut arm also may be connected with a pin through a second end of height of cut linkage 138.

In one embodiment, the height of cut and rake adjustment system may include a pair of adjustable and replaceable rake linkages 146. Each rake linkage may connect the upper end of front height of cut arm 113 to an intermediate portion of rear height of cut arm 114 below the pivot axis 123 of the rear height of cut arm. The height of cut and rake adjustment system may be used to reduce the rake or pitch of the mower deck by decreasing the effective length of the rake linkages which reduces the angle of the rear height of cut arms relative to the rotary cutting deck, or increase the rake or pitch by increasing the effective length of the rake linkages which increases the angle of the rear height of cut arms relative to the rotary cutting deck. Alternatively, each rake linkage may be replaced with another rake linkage having a different curvature.

In one embodiment, the rotary deck height of cut adjustment system may include a pair of rake linkages 146 that may be bars or rods extending fore and aft adjacent the left edge and right edge of the rotary cutting deck. Each rake linkage may be a flat, curved one piece steel structure having one or more holes through each of its ends. The same pins 139 used for the front height of cut linkages also may be used to connect the first end of each rake linkage to the second or upper end 118 of the front height of cut arm, and pin 149 may connect the second end of each rake linkage to an intermediate portion of the rear height of cut arm, below the rear height of cut arm's pivot axis 123. Each pin may be retained in place with a clip 141. The rake or pitch may be changed by taking out the clips and moving the pins into different holes, or selecting rake linkages with different lengths or curvatures.

The invention provides a height of cut and rake adjustment system for a rotary cutting deck that is modular, relatively low in cost, and reduces time and effort for maintenance and upkeep. The height of cut and rake of a rough, trim or surround mower deck may be adjusted easily and without requiring tools by changing or repositioning the height of cut and rake linkages.

Having described the preferred embodiment, it will become apparent that various modifications can be made without departing from the scope of the invention as defined in the accompanying claims.

The invention claimed is:
1. A height of cut and rake adjustment system, comprising:
    a front height of cut arm and a rear height of cut arm, each height of cut arm pivotably mounted to a rotary cutting deck on a pivot axis below an upper end of each height of cut arm;
    a height of cut linkage extending between the upper end of each front height of cut arm and the upper end of each rear height of cut arm; and a rake linkage extending between the upper end of each front height of cut arm and an intermediate portion of each rear height of cut arm below the pivot axis that is manually adjustable to change an angle of each rear height of cut arm relative to each front height of cut arm.

2. The height of cut and rake adjustment system of claim 1 wherein each of the height of cut and rake linkages is attached to the front and the rear height of cut arms with pins inserted through holes in each end of the linkages.

3. The height of cut and rake adjustment system of claim 1 wherein the height of cut linkage is a straight bar.

4. The height of cut and rake adjustment system of claim 1 wherein the rake linkage is a curved bar.

5. A height of cut and rake adjustment system, comprising:
- a pair of height of cut linkages extending fore and aft above a left side and a right side of a mower deck;
- a pair of rake linkages extending fore and aft adjacent the left side and right side of the mower deck;
- each of the pair of height of cut linkages and the pair of rake linkages having an effective length that is manually adjustable to change an angle of a pair of front height of cut arms and an angle of a pair of rear height of cut arms to adjust a rear height of the mower deck relative to a front height of the mower deck.

6. The height of cut and rake adjustment system of claim 5 wherein each height of cut linkage and each rake linkage is connected to one of the pair of front height of cut arms and one of the pair of rear height of cut arms with a pin held in place with a clip.

7. The height of cut and rake adjustment system of claim 5 wherein each rake linkage is connected to one of the pair of rear height of cut arms below a pivot point of the rear height of cut arm.

8. The height of cut and rake adjustment system of claim 5 wherein each height of cut linkage is connected to one of the pair of front height of cut arms and one of the pair of rear height of cut arms above a pivot point of each of the arms.

9. The height of cut and rake adjustment system of claim 5 wherein each height of cut linkage is a linear metal bar having at least one hole in each end.

10. The height of cut and rake adjustment system of claim 5 wherein each rake linkage is a curved metal bar having at least one hole in each end.

11. A height of cut and rake adjustment system, comprising:
- a plurality of mower decks on a rough, trim or surround mower;
- a pair of height of cut linkages extending above each of the mower decks;
- a pair of rake linkages extending alongside each of the mower decks;
- each pair of height of cut linkages and each pair of rake linkages having an effective length that is manually adjustable to change a height of cut and a rake angle by changing a rear height relative to a front height of each mower deck.

12. The height of cut and rake adjustment system of claim 11 wherein each pair of height of cut linkages and each pair of rake linkages are connected to a front height of cut arm and a rear height of cut arm with a pair of manually removable pins.

* * * * *